United States Patent [19]
Guehr

[11] 3,832,982
[45] Sept. 3, 1974

[54] COOLANT LOSS OR COOLANT PUMP MALFUNCTION DETECTION SYSTEM FOR INTERNAL COMBUSTION ENGINES

[76] Inventor: Helmut Guehr, Ruthdale, W. Va. 25304

[22] Filed: Sept. 10, 1973

[21] Appl. No.: 395,740

[52] U.S. Cl............. 123/41.15, 123/198 D, 340/59
[51] Int. Cl......................... F01p 5/14, F01p 11/14
[58] Field of Search ....... 123/41.15, 198 D; 340/59, 340/244 C

[56] References Cited
UNITED STATES PATENTS

| | | | |
|---|---|---|---|
| 1,768,446 | 6/1930 | Gron...................................... | 340/59 |
| 2,700,153 | 1/1955 | Huckabee......................... | 340/244 C |
| 2,713,678 | 7/1955 | Krokstrand...................... | 340/244 C |
| 3,179,920 | 4/1965 | McGinty............................... | 340/59 |
| 3,252,420 | 5/1966 | Sorensen.......................... | 340/244 C |
| 3,292,427 | 12/1966 | Mattson........................... | 123/41.15 |
| 3,312,936 | 4/1967 | Huntzinger........................... | 340/59 |
| 3,499,481 | 3/1970 | Avrea............................... | 123/41.15 |
| 3,641,544 | 2/1972 | Radin.................................... | 340/59 |
| 3,694,804 | 9/1972 | Hill................................... | 123/41.15 |
| 3,763,836 | 10/1973 | Guehr.............................. | 123/41.15 |

Primary Examiner—Manuel A. Antonakas
Assistant Examiner—Daniel J. O'Connor
Attorney, Agent, or Firm—Edward G. Atkins

[57] ABSTRACT

A detection system for indicating coolant loss or coolant pump malfunction in a liquid cooled internal combustion engine has been designed which consists of an auxiliary tank in communication with the radiator of the engine such auxiliary tank having enclosed within it an overflow cup designed to direct coolant flow over two condition-sensing devices or probes. In normal engine operation, coolant, which is electrically conductive, flows over the probes and an electrical current is maintained between the two probes. Circuity attached to these probes indicate this to be a normal condition. When no coolant flows across the probes, either because of coolant loss or pump malfunction, another circuit is activated which switches on a warning light located on the dash of the motor vehicle indicating lack of coolant flow.

8 Claims, 4 Drawing Figures

3,832,982

COOLANT LOSS OR COOLANT PUMP MALFUNCTION DETECTION SYSTEM FOR INTERNAL COMBUSTION ENGINES

BACKGROUND OF THE INVENTION

1. Field of the Invention

This invention relates to a device for detecting coolant loss or coolant pump malfunction in liquid-cooled internal combustion engines having a radiator assembly and coolant pump. More particularly this invention relates to a two-probe condition-sensing device located in an auxiliary tank above the radiator at a point above the coolant level in such radiator. An electrical detection circuit is attached to the sensing devices and is responsive to the conditions sensed by such sensing device.

2. Description of the Prior Art

Various detection devices have been devised for determining coolant levels in radiators of internal combustion engines. Typical of the devices are those described in the patents to McGinty (U.S. Pat. No. 3,179,920), Huntzinger (U.S. Pat. No. 3,312,936), Huckabee (U.S. Pat. No. 2,700,153) and Mattson (U.S. Pat. No. 3,292,427). In each of these patents, a condition-sensing device, or probe, is located in the radiator and while being able to indicate water level, these devices will not indicate whether there is a pump malfunction in the system. In a copending application (Ser. No. 102,407), a detection device is shown which will not only detect coolant loss in a liquid coolant internal combustion engine, but which will also determine whether there is a pump malfunction in the system. This system utilizes a single probe in its operation. When coolant is flowing normally in this single probe system, current flows from the probe through the coolant and to ground. When the flow of coolant stops, the detector, by means of a circuit designed for such contingency, should be activated. In a single probe system, however, some current may still flow across the wet insulators of the probe even in the absence of coolant flow and establish a current through the radiator thus bypassing the detector circuit. When the insulator of the probe is wet with an anti-freeze solution, which often is a better conductor than water, the detection system may fail to respond to a cooling system malfunction.

SUMMARY OF THE INVENTION

The problem manifested by a single probe detection system may be overcome by installing a second probe in the system and making the detection system dependent on interruption of electrical current flow between two probes rather than dependant on the interruption of electrical current flow between a single probe and a ground.

Briefly, this detection system is adopted for use in a cooling system of an internal combustion engine having a radiator, a radiator inlet hose to the radiator, a radiator outlet hose from the radiator, a pump, engine, an auxiliary tank in communication with the radiator and located above the water level in the radiator, an overflow cup located or provided on the bottom of the overflow tank, and an auxiliary coolant line from the engine communicating, or passing, to the bottom of the overflow cup. Two condition-sensing devices or probes are located in the auxiliary tank and just below the level of the overflow such that when coolant is flowing it passes over both probes.

These probes are located in an electrical circuit such that when coolant is flowing, a circuit is established from one probe, through the coolant, which is electrically conductive, to the other probe. When the engine is running and coolant does not contact both probes, no electrical circuit is maintained between the probes and another circuit is established which activates a warning device such as a light or buzzer.

In detection systems of the type herein described, the current flow across the two probes is small, generally in the range of 10 to 50 micro amp. Because of this small magnitude, amplification is necessary to activate the warning devices. This amplification can be provided by means of any standard amplification means which may include, as described below, transistors. Combinations of transistors and relays are also contemplated.

The system described herein is especially useful in cooling systems of automobiles, buses, trucks and the like. Modification of the standard radiator is required to provide for the auxiliary tank containing the overflow cup and probes. The circuit system may be incorporated into the standard electrical system of a motor vechicle with appropriate lights or other warning devices located on its instrument panel. The condition-sensing device is usually a copper probe or stainless steel but may be made of other material sufficiently electrically conductive to achieve the desired result.

DESCRIPTION OF THE PREFERRED EMBODIMENTS

Figure 2:
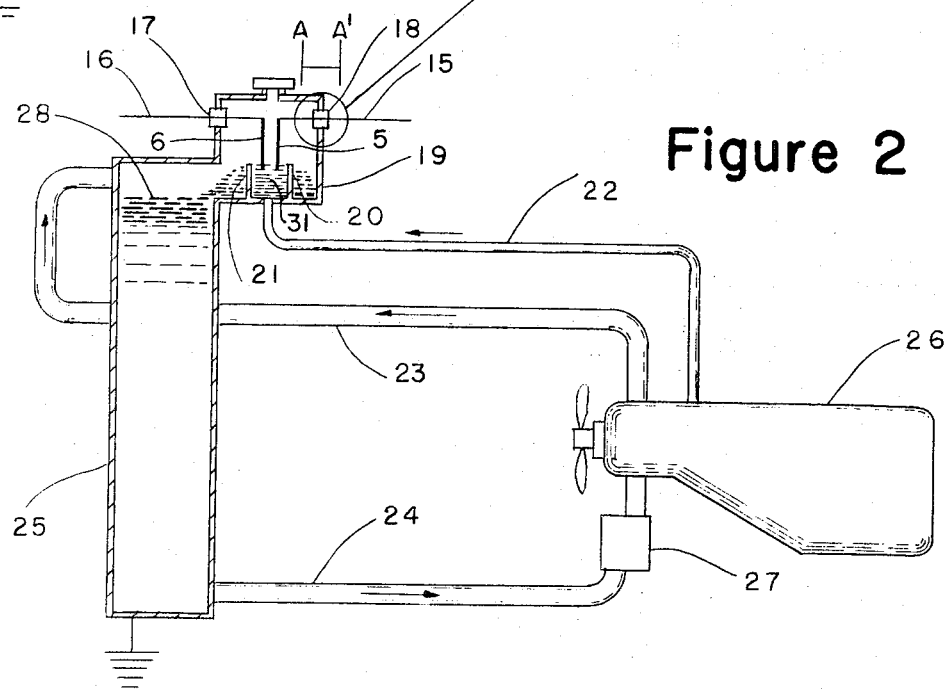
FIG. 2 is a schematic diagram of the two probe detection system made in accordance with this invention.

Referring now to FIG. 2, engine 26 is an internal combustion engine of the liquid-cooled variety in which a liquid coolant, such as water, is circulated through its cooling jacket via pump means 27.

The principle amount of liquid coolant, usually water, travels from engine 26 to radiator 25 through radiator inlet passage 23 generally being a standard radiator hose. The coolant is circulated back from radiator 25 to the engine 26 via radiator outlet passage 24, such passage again generally being a standard radiator hose.

Adjacent to and communicating with the radiator 25 is an auxiliary tank or "sender" 19. This auxiliary tank 19 is generally located above the radiator liquid level 28 and communicates with the radiator 25 at a point above such liquid level. Located at the bottom of auxiliary tank 19 is a cup 31 formed by walls 20 and 21. Communicating with cup 31 is auxiliary tank coolant line 22 which provide for the passage of coolant from engine 26. The auxiliary tank coolant line 22 communicates with the bottom of auxiliary tank 19 at a point corresponding with the bottom of cup 31.

Incorporated into auxiliary tank 19 are probes 5 and 6. Probe 6 is attached to lead 16 and is insulated from the auxiliary tank 19 via insulation means 17. Probe 5 likewise is attached to lead 15 and insulated from the auxiliary tank 19 via insulation means 18. Such insulation means is generally a non-conductive material such as rubber, etc. Probes 5 and 6 terminate in the cup 31 just below the level formed by walls 20 and 21. In normal operation, a small amount of coolant travels through auxiliary tank coolant line 22 to the bottom of cup 31 which fills and overflows unto the auxiliary tank or "sender" 19. Because of their portion just below the level of the overflow cup, probes 5 and 6 will be immersed in coolant. This auxiliary coolant ultimately finds its way to the radiator 25 via the opening between the auxiliary tank 19 and the radiator 25.

Figure 4:
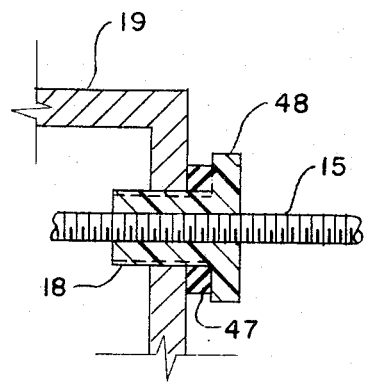
FIG. 4 is an enlarged vertical cross-sectional view of a portion of FIG. 2 along A-A', FIG. 2 showing more detailed.

Referring now to FIG. 4, which is an enlarged section of a portion of FIG. 2, more detail is shown. In this view, insulation 18 consist of nylon threaded through the wall of auxiliary tank 19. Interposed between the wall of auxiliary tank 18 and the circular lip 48 of nylon insulator 18 is a rubber washer 47. Thus, tighting of the insulation 18 against the rubber washer insures a watertight seal. Threaded through the nylon insulator 18 is a self-supporting threaded stainless steel or copper rod which serves as the lead from the probe to the circuity described below. The probe itself may merely by a continuation of the lead. In like manner, lead 16 and probe 6 are connected to the opposite side of auxiliary tank 18.

Figure 1:
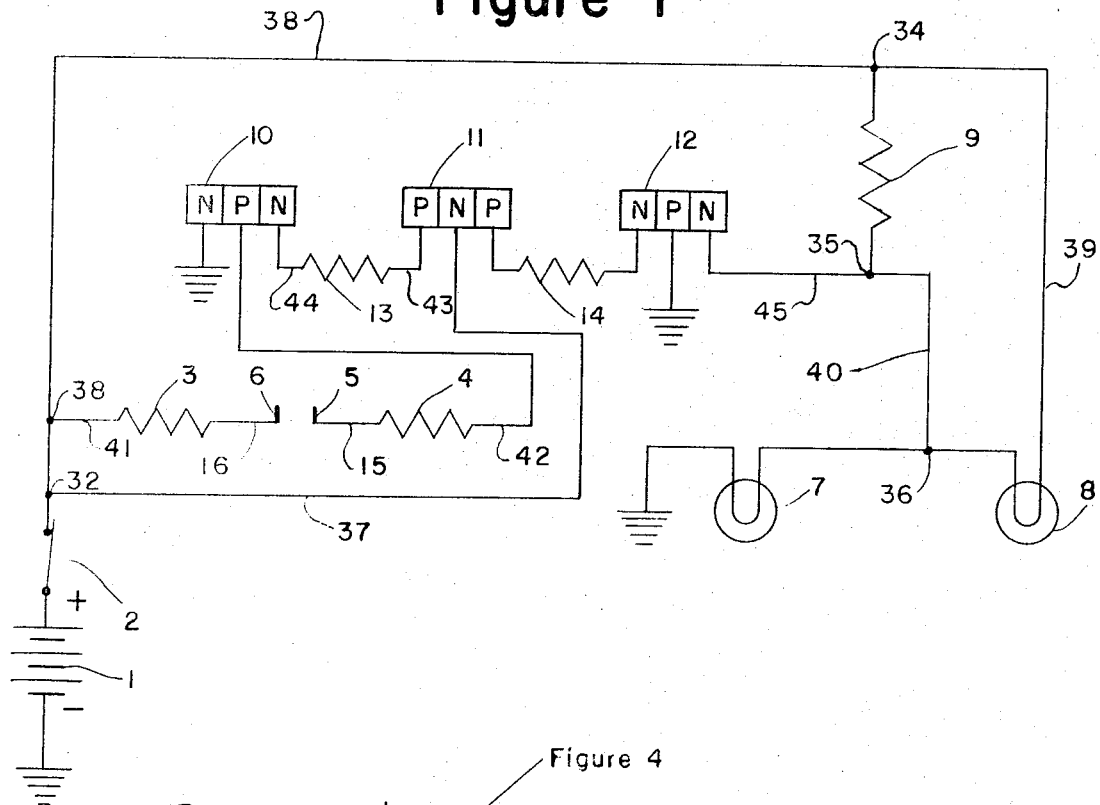
FIG. 1 is a schematic or circuit diagram a one detection system which may be used in the two probe system.

Referring now to FIG. 1, there is illustrated a circuit diagram by which an interruption of coolant flow through the cooling system may be determined. The primary purpose of this system is to amplify the current in the system in an amount sufficient to activate the warning lights when necessary.

In this system battery 1 is connected through resistor 3 to probe 6. Probe 5 is connected through resistor 4 to the base of NPN transistor 10. Transistor 10 is itself connected in series with PNP transistor 11 and NPN transistor 12. Battery 1 is also connected to the emitter of PNP transistor 11, the second of the three transistors connected in series. Battery 1 is also connected in series with lights 7 and 8 with a bypass of light 8 at junction 34. Current through such bypass goes through resistor 9 and light 7 to ground. The purpose of the transistor are to amplify currect across resistance 9, so that in normal operation when coolant is flowing across probes 5 and 6, light 8 is illuminated.

In the operation of the detection system shown in FIG. 1, a current generated by battery 1 is passed to junction 32 through switch (ignition switch) 2 shown in a closed position. When the engine is not on and no coolant flows across probes 5 and 6, current flows from junction 32 through lead 38 to junction 34. At this point current passes through resistor 9 which has a resistance lower than light 8, and through light 7 via lead 40 to ground. Light 7 may be colored red to indicate a condition in which coolant is not flowing. Current through lead 40 at this point is greater than the current through lead 39. Thus, light 7, which has the same resistance as light 8, flashes on.

When the engine is on and coolant is flowing over probes 5 and 6, current is established from junction 33 through lead 41, resistor 3, lead 16, lead 15, resistor 4, and lead 42 to the base of NPN transistor 10 to its emitter to ground. At the same time current from junction 32 passes through lead 37 to the emitter of PNP transistor 11. Current thus established to the emitter of PNP transistor 11 passes to the base of this transistor, through lead 43, resistor 13, and lead 44 to the collector of NPN transistor 10. Thence the current flows from the emitter of NPN transistor 10 to ground.

Current from the collector of transistor 11 is carried through resistor 14 to the base of transistor 12. Current through base of transistor 12 is carried to its emitter to ground. Current through lead 45 flows through the collector of NPN transistor 12 to its emitter to ground.

Current, in addition to flowing through the transistor as indicated above, also flows from junction 33 through lead 38 to junction 34 when the engine is operating. The effect of the transistors, however, has been to amplify the voltage across resistance 9, causing light 8, usuall green, to flash on. This junction 35 is effectifely ground. This indicates that the system is operating normally.

In a system malfuncation, such as when coolant is suddenly lost or when a pump malfunctions, current across probes 5 and 6, which in normal operation is established through the liquid coolant, is broken and the transistors do not function. Current then flows as described above when the ignition switch is on but the engine not operating. The green light 8 goes off and the red light 7 goes on indicating an abnormal condition.

Figure 3:
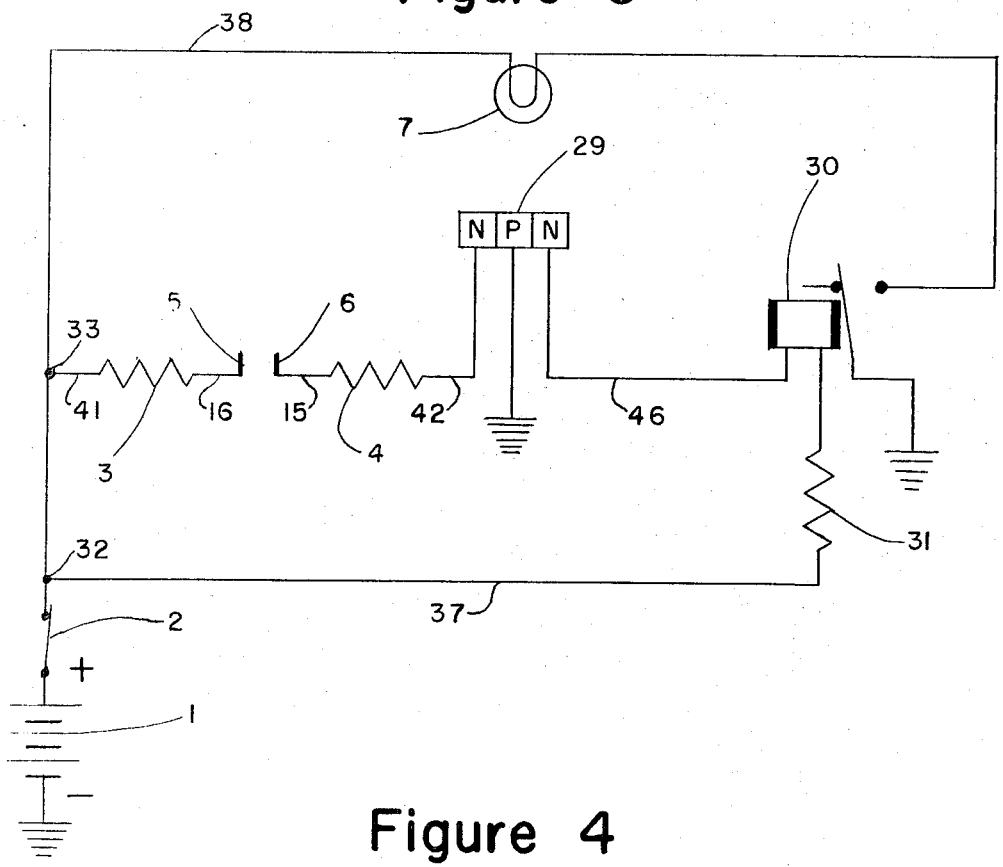
FIG. 3 is a schematic or circuit diagram of another form of the two probe detection system.

Referring now to FIG. 3, other circuit means are shown by which the two probe system may operate. This embodiment shown the use of a transistor in combination with a relay. In this system, a current generated by battery 1 is passed to junction 32 through switch (ignition switch) 2 shown in a closed position. When the engine is not on and no coolant flows across probes 5 and 6 and current flows from junction 32 through lead 38 through light 7, to ground through relay switch 30 shown in a closed position by the dotted line. When the engine is not running the light flashed on indicating no coolant flow. In this system battery 1 is connected through resistor 3 to probe 6. Probe 5 is connected through resistor 4 to the base of NPN transistor 29 which is connected in series to a relay switch 30. Battery 1 is also connected in series with relay 30 and light 7. As above, the purpose of the transistor is to amplify the current to relay 30 causes it to open when coolant is flowing.

When the engine is on and coolant is flowing over probes 5 and 6, current is established from junction 33 through lead 41, resistor 3, lead 16, lead 15, resistor 4 and lead 42 to the base of an NPN transistor 29. Transistor 29 amplifies the current in lead 46 to the extent that relay 30 open (indicated by solid line) cutting off the current through light 7. Thus, when the coolant is flowing across probe 5 and 6, the light 7 is out indicating a normal condition.

In a system malfunction such as where coolant is suddenly lost or when a pump malfunctions, electrical current across probes 5 and 6 is broken and the amplification effect of the transistor is lost. The relay thus closes establishing a circuit through light 7 indicating an abnormal condition.

The type of transistor used in this system depends, of course, on various factors such as role of coolant flow, radiator sixe, probe size and type, etc. Those employed in the system described are standard items manufactured by Motorola Corporation and known as Models HEP 52,247 and 723.

I claim:

1. In a cooling system of an internal combustion engine having a radiator, a radiator inlet hose to the radiator, a radiator outlet hose from the radiator, a pump, an engine, and an electrically conductive liquid coolant circulating between the engine and radiator, the improvement which comprises:
   a. an auxiliary tank in communication with the radiator and located above the liquid coolant level in the radiator,
   b. an overflow cup located on the bottom of said auxiliary tank,
   c. an auxiliary coolant line from the engine communicating with the bottom of the overflow cup,
   d. two electrically conductive probes means located in the auxiliary tank and just below the level of the overflow cup, and
   e. an electrical detection circuit attached to the probes and responsive to coolant flow being out of contact with said probes.

2. A cooling system as in claim 1 wherein the electrical detection circuit attached to the probe means, comprising in combination, a source of electrical energy, switch means, light indicating means, and circuit means connected to said probe means, switch means and source of electrical energy, said circuit means being responsive to the breaking of electrical contact between the two probe means as a result of said liquid coolant being out of contact with either of said two probe means said breaking of electrical contact between the two probe means effectuating lighting of said light indicating means.

3. A cooling system as in claim 2 wherein the electrical detection circuit contains in addition current amplification means.

4. A cooling system as in claim 3 wherein the current amplification means consists of transistors.

5. A cooling system as in claim 4 wherein the current amplification means consists of three transistors connected in series.

6. A cooling system as in claim 5 wherein the electrical detection circuit contains in addition relay means.

7. A cooling system as in claim 1 wherein the electrical conductive probes are copper.

8. A cooling system as in claim 1 wherein the electrical conductive probes are stainless steel.

* * * * *